United States Patent [19]

Furuya et al.

[11] Patent Number: 6,139,952
[45] Date of Patent: Oct. 31, 2000

[54] BIAXIALLY ORIENTED POLYESTER FILM FOR A MEMBRANE SWITCH

[75] Inventors: Koji Furuya; Shinya Watanabe; Shinichi Kawai; Kenji Suzuki, all of Sagamihara, Japan

[73] Assignee: Teijin Limited, Osaka, Japan

[21] Appl. No.: 09/381,128

[22] PCT Filed: Nov. 20, 1998

[86] PCT No.: PCT/JP98/05242

§ 371 Date: Sep. 16, 1999

§ 102(e) Date: Sep. 16, 1999

[87] PCT Pub. No.: WO99/37466

PCT Pub. Date: Jul. 29, 1999

[30] Foreign Application Priority Data

| | | | |
|---|---|---|---|
| Jan. 21, 1998 | [JP] | Japan | 10-009390 |
| Oct. 20, 1998 | [JP] | Japan | 10-297949 |

[51] Int. Cl.[7] .............. B32B 5/16; C08G 63/02; H01H 1/10
[52] U.S. Cl. ............ 428/339; 528/298; 264/210.1; 264/210.6; 264/210.7; 264/211.12; 264/212; 428/174; 428/332; 428/340; 200/512
[58] Field of Search ............ 528/298; 264/210.1, 264/210.6, 210.7, 211.12, 211.2, 212; 428/174, 332, 339, 340; 200/512

[56] References Cited

U.S. PATENT DOCUMENTS

| | | | |
|---|---|---|---|
| 4,725,479 | 2/1988 | Utsumi | 428/209 |
| 5,312,893 | 5/1994 | Hamano et al. | 528/190 |
| 5,380,577 | 1/1995 | Hamano et al. | 428/143 |
| 5,731,071 | 3/1998 | Etchu et al. | 428/220 |

FOREIGN PATENT DOCUMENTS

| | | |
|---|---|---|
| 4-50890 | 7/1986 | Japan . |
| 4-75610 | 4/1987 | Japan . |
| 6-4276 | 6/1987 | Japan . |
| 3-134052 | 6/1991 | Japan . |
| 4-50890 | 8/1992 | Japan . |
| 6-4276 | 1/1994 | Japan . |

OTHER PUBLICATIONS

Taiwan Office Action dated Nov. 24, 1999.
International Search Report.

*Primary Examiner*—Samuel A. Acquah
*Attorney, Agent, or Firm*—Sughrue, Mion, Zinn, Macpeak & Seas, PLLC

[57] ABSTRACT

A biaxially oriented polyester film for a membrane switch, which is made from a polyester containing at least 80 mol % of ethylene-2,6-naphthalene dicarboxylate recurring units and which has an endothermic peak with an endothermic energy of at least 0.4 mJ/mg at a temperature of 110 to 160° C.

This film is produced by subjecting a biaxially oriented polyester film produced from the above polyester in accordance with a method known per se to the following steps in the order named:

(1) the step of heating the film under no strain at a temperature of 150 to 180° C. for 1 to 5 hours; and
(2) the step of heating the film in an unrolled or rolled state at a temperature of 80 to 122° C. for 5 to 200 hours.

22 Claims, No Drawings

BIAXIALLY ORIENTED POLYESTER FILM FOR A MEMBRANE SWITCH

TECHNICAL FIELD

The present invention relates to a film for a membrane switch and, more specifically, to a biaxially oriented polyester film for a membrane switch, which is made from a polyester comprising ethylene-2,6-naphthalene dicarboxylate as a main recurring unit and which has excellent deformation resistance during its use at high temperatures.

BACKGROUND ART

As disclosed at page 111 of the "'85 edition of Switch Latest Technology" published by Sogo Gijutsu Syuppansha on Sep. 28, 1984, a membrane switch comprises a spacer between two base films to define a space between the two base films and contact points (electrodes) arranged on the opposed surfaces of the two base films which face each other with the space in between. By depressing one of the base films, two contact points are brought into contact with each other to conduct electricity and by releasing the depressed base film, they are disconnected from each other, thus effecting a switching function.

In recent years, such a membrane switch has been frequently used as a key board switch for calculators and personal computers, a panel switch for the remote controller of TVs and VTRs, and the like.

Since this membrane switch effects a switching function by alternating being depressed and released, flexibility, that is, deformation resistance is required for the base film of the membrane switch. Heretofore, a polyethylene terephthalate (may be abbreviated as "PET" hereinafter) film has been generally and frequently used as the base film of this membrane switch due to its deformation resistance, adhesion to electrodes, adhesion to printing and the like.

However, owing to the recent use of touch panels for car audio systems and car air conditioning systems or remote control switches in a vehicle due to the popularization of car navigation systems, deformation resistance at high temperatures is required for the base film of the membrane switch.

When a PET film is used as the base film of the membrane switch as before, temperature inside a vehicle (about 80° C.) may exceed the glass transition temperature of PET in summer and the membrane switch may malfunction due to the great deformation of a PET film.

To prevent this, JP-B 4-75610 proposes that a polyethylene naphthalene dicarboxylate (may be abbreviated as "PEN" hereinafter) film which has a higher glass transition temperature than a PET film be used as the base film in place of the PET film.

That is, JP-B 4-75610 discloses a membrane switch having contact points on the opposed surfaces of two base films, at least one of which is a biaxially oriented polyethylene naphthalene dicarboxylate film having an F-5 value (5% elongation stress) of 11 kg/mm$^2$ or more, a density of 1.375 g/cm$^3$ or less and a thermal shrinkage factor of 1.0% or less when heated at 120° C. for 30 minutes.

JP-B 6-4276 discloses a polyester film for a membrane switch which is made from polyethylene naphthalate having a haze increase rate defined by the following expression of 20% or less when heated at 150° C. for 2 hours:

haze increase rate=$(H_2-H_1)/H_1 \times 100$ (%)

wherein $H_1$ is a haze value before the heat treatment and $H_2$ is a haze value after the heat treatment, and thermal shrinkage factors in both longitudinal and transverse directions of 0.5% or less.

However, standards for deformation resistance have been reviewed due to the influence of the recent enforcement of the PL Act and it has been pointed out that even a PEN film is unsatisfactory in terms of deformation resistance. When a membrane switch is used as a pressure sensor, especially when it is embedded in a seat of an automobile equipped with an air bag as a pressure sensor of a weight detection system for detecting pressure to alter the inflation speed of the air bag according to an adult or a child, a conventional PEN film has large residual deformation and cannot be used.

DISCLOSURE OF THE INVENTION

It is an object of the present invention to provide a biaxially oriented polyester film for a membrane switch, which is made from a polyester comprising ethylene-2,6-naphthalene dicarboxylate as a main recurring unit and which has excellent deformation resistance during its use at high temperatures.

It is another object of the present invention to provide a biaxially oriented polyester film for a membrane switch, which is made from a polyester comprising ethylene-2,6-naphthalene dicarboxylate as a main recurring unit and which has excellent heat resistance, switching performance, dimensional stability, flexing resistance and processability.

It is still another object of the present invention to provide a biaxially oriented polyester film for use in a membrane switch used in an automobile, machine such as a heating vessel peripheral, or portable equipment where it may be exposed to high temperatures.

It is still another object of the present invention to provide a process for producing the aforementioned biaxially oriented polyester film of the present invention.

It is still another object of the present invention to provide a membrane switch comprising the biaxially oriented polyester film of the present invention.

Other objects and advantages of the present invention will become apparent from the following description.

According to the present invention, firstly, the above objects and advantages of the present invention are attained by a biaxially oriented polyester film for a membrane switch, (A) which is made from a polyester containing ethylene-2,6-naphthalene dicarboxylate recurring units in an amount of at least 80 mol %; and (B) which has an endothermic peak with an endothermic energy of at least 0.4 mJ/mg at a temperature of 110 to 160° C.

DETAILED DESCRIPTION OF THE INVENTION

The biaxially oriented polyester film for a membrane switch of the present invention comprises a polyester (A) which contains ethylene-2,6-naphthalene dicarboxylate recurring units in an amount of at least 80 mol %.

The polyester (A) comprehends an ethylene-2,6-naphthalene dicarboxylate homopolymer and a copolymer containing ethylene-2,6-naphthalene dicarboxylate recurring units in an amount of at least 80 mol %.

Dicarboxylic acid components forming the copolymer other than 2,6-naphthalenedicarboxylic acid are dicarboxylic acids such as oxalic acid, adipic acid, phthalic acid, sebacic acid, dodecanedicarboxylic acid, isophthalic acid, terephthalic acid, 1,4-cyclohexanedicarboxylic acid, 4,4'- diphenyldicarboxylic acid, phenylindanedicarboxylic acid, 2,7-naphthalenedicarboxylic acid and diphenyl ether dicarboxylic acid. Diol components forming the copolymer other than ethylene glycol are diols such as propylene glycol, trimethylene glycol, tetramethylene glycol, hexamethylene glycol, cyclohexanemethylene glycol, neopentyl glycol, bisphenol sulfone adduct with ethylene oxide, bisphenol A adduct with ethylene oxide, diethylene glycol and polyethylene oxide glycol.

Oxycarboxylic acids such as p-oxybenzoic acid and p-oxyethoxybenzoic acid may also be contained as a copolymer component.

The copolymer may have terminal hydroxyl groups and/or carboxyl groups that have been partly or wholly terminated by a monofunctional compound such as benzoic acid or methoxypolyalkylene glycol, or may be obtained by copolymerizing a compound having at least three ester-forming functional groups such as glycerin or pentaerythritol in such a trace amount that a substantially linear polymer can be obtained.

The polyester (A) preferably contains ethylene-2,6-naphthalene dicarboxylate recurring units in an amount of at least 85 mol %, more preferably at least 90 mol %.

The biaxially oriented polyester film of the present invention may be a composition comprising the above polyester (A) and other organic polymer.

Illustrative examples of the other organic polymer include known polyesters, polyamides, polyimides, polyether imides and polyalkylenes. Of these organic polymers, polyesters such as polyethylene terephthalate, polyethylene isophthalate, polytrimethylene terephthalate, polyethylene-4,4'-tetramethylenediphenyl dicarboxylate, polyethylene-2,7-naphthalene dicarboxylate, polytrimethylene-2,6-naphthalene dicarboxylate, polyneopentylene-2,6-naphthalene dicarboxylate and poly(bis(4-ethyleneoxyphenyl)sulfone)-2,6-naphthalene dicarboxylate are preferred from the viewpoint of compatibility with the polyester (A). Of these, polyethylene terephthalate, polyethylene isophthalate, polytrimethylene terephthalate, polytrimethylene-2,6-naphthalene dicarboxylate and poly(bis(4-ethyleneoxyphenyl)sulfone)-2,6-naphthalene dicarboxylate are particularly preferred.

As for the ratio of the polyester (A) to the other organic polymer, the other organic polymer is preferably contained in an amount of 20 parts or less by weight, more preferably 15 parts or less by weight based on 100 parts by weight of the polyester (A).

In the present invention, the polyester (A) preferably has an intrinsic viscosity of 0.40 to 0.90 dl/g, more preferably 0.43 to 0.85 dl/g, particularly preferably 0.45 to 0.80 dl/g. When the intrinsic viscosity is lower than 0.40 dl/g, the obtained film becomes fragile, is readily burred at cut ends, and may be cracked from part of a bur and broken while carried from one step to another. On the other hand, when the intrinsic viscosity is higher than 0.90 dl/g, polymerization takes long with a commonly used synthesis method, thereby reducing productivity disadvantageously. Since dedicated equipment is required to carry out a special polymerization method (such as solid-phase polymerization), production cost rises, which is one of the reasons why the intrinsic viscosity of higher than 0.90 dl/g is undesirable.

The polyester (A) may contain such additives as a stabilizer, lubricant, ultraviolet absorber and flame retardant.

To provide slipperiness to the film, a small amount of inert fine particles is preferably contained in the polyester (A).

Illustrative examples of the inert fine particles include inorganic particles such as spherical silica, porous silica, calcium carbonate, alumina, titanium dioxide, kaolin clay, barium sulfate and zeolite; and organic particles such as silicone resin particles and crosslinked polystyrene particles. Synthetic inorganic particles are more preferred than natural inorganic particles because they are uniform in diameter, and inorganic particles having any crystal form, hardness, specific gravity and color may be used. One type or two or more different types of inert fine particles selected from the above examples may be added to the film.

The average particle diameter of the above inert fine particles is preferably in the range of 0.05 to 5.0 μm, more preferably 0.1 to 3.0 μm. The content of the inert fine particles is preferably 0.001 to 1.0 wt %, more preferably 0.03 to 0.5 wt %.

The time of adding the inert fine particles is not particularly limited as long as it is before a film is formed from the polyester (A), for example, in the stage of polymerization or at the time of film formation.

The biaxially oriented polyester film of the present invention has an endothermic peak with an endothermic energy of at least 0.4 mJ/mg at a temperature of 110 to 160° C. The existence of this endothermic peak and the quantity of the endothermic energy thereof are confirmed by a differential scanning calorimeter (may be abbreviated as DSC hereinafter). This endothermic peak is different from a peak indicating the heat of crystal fusion. Since the film is excellent in deformation resistance at high temperatures when both the temperature at which the endothermic peak appears and the quantity of the endothermic energy are within the above ranges, a membrane switch works properly during its use at high temperatures. The quantity of the endothermic energy is preferably at least 0.5 mJ/mg, more preferably 0.5 to 4.0 mJ/mg. The endothermic peak is preferably existent in the temperature range of 115 to 155° C.

The biaxially oriented polyester film of the present invention preferably has a density of 1.345 to 1.370 g/cm$^3$, more preferably 1.350 to 1.365 g/cm$^3$. When the density is smaller than 1.345 g/cm$^3$, the recovery of the film from the deformation caused by alternating depressing and releasing a membrane switch formed of the film is small and the membrane switch easily malfunctions disadvantageously. On the other hand, when the density is larger than 1.370 g/cm$^3$, crystallinity becomes too high with the result that the stiffness of the film is lost. Therefore, the film is not preferred as a base film for a membrane switch.

The biaxially oriented polyester film of the present invention preferably has a deformation increase of 0.070% or less in a desired direction, for example, longitudinal direction (MD) or transverse direction (TD) after placed under a load of 0.75 kg/mm$^2$ at 80° C. for 30 hours. When the deformation increase is more than 0.070%, the plastic deformation of the film becomes large at the time of depressing a membrane switch formed of the film at a high temperature, whereby the operation accuracy of the membrane switch is liable to deteriorate during its use at high temperatures. The deformation increase in both the longitudinal direction (MD) and the transverse direction (TD) is more preferably 0.065% or less, particularly preferably 0.060% or less.

The biaxially oriented polyester film of the present invention preferably has a residual deformation of 0.090% or less in a desired direction, for example, longitudinal direction (MD) or transverse direction (TD) after it is placed under a load of 0.75 kg/mm$^2$ at 80° C. for 30 hours and after the load is removed. When the residual deformation is larger than 0.090%, the deformation of the film remains even after the load on a membrane switch formed of the film is removed, whereby the operation accuracy of the membrane switch is liable to deteriorate.

The residual deformation in both the longitudinal direction (MD) and the transverse direction (TD) is more preferably 0.085% or less, particularly preferably 0.080% or less.

The biaxially oriented polyester film of the present invention preferably has a 1% elongation stress of 4.5 to 7.0 kg/mm$^2$ in a desired direction, for example, longitudinal direction (MD) or transverse direction (TD).

When the 1% elongation stress is smaller than 4.5 kg/mm$^2$, non-uniformity in the thickness of the film tends to be large due to insufficient film stiffness or insufficient stretching, thereby causing instable conditions for processing a membrane switch.

A film having a 1% elongation stress of more than 7.0 kg/mm$^2$ is broken easily and frequently during film formation, whereby film-forming properties become unsatisfactory and productivity is apt to lower.

The 1% elongation stress in both the longitudinal direction (MD) and the transverse direction (TD) is more preferably 4.7 to 6.8 (kg/mm$^2$).

The biaxially oriented polyester film of the present invention preferably has Young's moduli of 400 to 700 kg/mm$^2$ in two directions intersecting at a right angle, for example, longitudinal direction (MD) and transverse direction (D). When the Young's moduli are smaller than 400 kg/mm$^2$, the stiffness of the film becomes insufficient.

When the Young's moduli are larger than 700 kg/mm$^2$, delamination is likely to occur at the time of cutting the film or chippings are liable to be produced in large quantity. Although the difference between Young's moduli in both directions is not particularly limited, it is preferably 150 kg/mm$^2$ or less.

The biaxially oriented polyester film of the present invention preferably has a refractive index in a thickness direction of 1.490 to 1.530, more preferably 1.495 to 1.520. When the refractive index in the thickness direction is smaller than 1.490, burrs or cracks are frequently formed by punching or cutting the film, whereby its processability deteriorates disadvantageously. On the other hand, when the refractive index in the thickness direction is larger than 1.530, non-uniformity in the thickness of the film becomes large, whereby wrinkles (flutes) are readily formed on the surface of the film disadvantageously.

The biaxially oriented polyester film of the present invention preferably shows a moisture-vapor transmission of 0.03 to 0.35 g/m$^2$·mm·24 hr, more preferably 0.05 to 0.30 g/m$^2$·mm·24 hr. When the moisture-vapor transmission is higher than 0.35 g/m$^2$·mm·24 hr, water vapor easily enters the switch. If water vapor enters the switch and the switch is exposed to a high-temperature and high-humidity environment and then to a low-temperature environment, dew may be condensed in the inside of the switch and the switch may malfunction disadvantageously.

The biaxially oriented polyester film of the present invention has a thermal shrinkage factor of 0.20% or less, more preferably 0.15% or less, in a desired direction, for example, longitudinal direction or transverse direction when heated at 150° C. for 30 minutes. When the thermal shrinkage factor is more than 0.20% after a 30-minute heat treatment at 150° C., the operation accuracy of the switch is liable to deteriorate due to a large dimensional change and the flatness of the film is also lowered disadvantageously.

The difference of thermal shrinkage factor between the two directions intersecting at a right angle is preferably 0.10% or less to prevent a reduction in flatness.

The biaxially oriented polyester film of the present invention preferably has a plane orientation coefficient of 0.242 to 0.270. When the plane orientation coefficient is smaller than 0.242, non-uniformity in the thickness of the film becomes large, whereby wrinkles (flutes) are easily formed on the surface of the film. On the other hand, when the plane orientation coefficient is larger than 0.270, burrs or cracks are frequency formed by punching the film, thereby deteriorating processability.

The plane orientation coefficient is more preferably 0.245 to 0.265.

The biaxially oriented polyester film of the present invention preferably has a center line average surface roughness (Ra) of 5 to 200 nm, more preferably 7 to 150 nm. When the surface roughness (Ra) is smaller than 5 nm, the slipperiness of the film degrades, whereby blocking between films frequently occurs when the film is wound round a roll and scratches are frequently formed by a carrying roll during the running of the film.

The biaxially oriented polyester film of the present invention preferably has a thickness of 12 to 250 $\mu$m. The thickness is more preferably 25 to 250 $\mu$m, particularly preferably 50 to 200 $\mu$m, from the viewpoint of film strength and flexibility.

The biaxially oriented polyester film of the present invention has a thickness non-uniformity of 10% or less. In other words, the thickness non-uniformity is 10% or less, that is, ±5% of the thickness of the film. When a film having a thickness non-uniformity of more than ±5% is used as a base material for a membrane switch, the intervals in between switches do not become constant due to thickness non-uniformity even if the switches are designed and fabricated in the same way, whereby the operation condition differs by each switch disadvantageously. Particularly when the film is used for a membrane switch for controlling the inflation pressure of a car air bag, thickness non-uniformity is an extremely important factor because the malfunction of the switch directly affects people's lives.

The biaxially oriented polyester film of the present invention can be produced by a process which comprises subjecting a biaxially oriented polyester film produced from a polyester (A) containing at least 80 mol % of ethylene-2,6-naphthalene dicarboxylate recurring units in accordance with a process known per se to the following steps in the order named:

(1) the step of heating the film at a temperature of 150 to 180° C. for 1 to 5 hours under no strain; and (2) the step of heating the film in an unrolled or rolled state at a temperature of 80 to 122° C. for 5 to 200 hours.

The above process known per se includes, for example, one which comprises stretching an unstretched film of the polyester (A) to 2.0 to 5.0 times, preferably to 2.2 to 4.3 times, in longitudinal and transverse directions at a temperature of Tg to (Tg+60)° C. and heat-setting the biaxially oriented film at a temperature of (Tg+70) to (Tg+140)° C., preferably (Tg+80) to (Tg+137)° C., particularly preferably (Tg+100) to (Tg+133)° C. for 1 to 100 sec. Stretching may be carried out with commonly used means using a roll or a stenter. The film may be stretched in longitudinal and transverse directions simultaneously or sequentially.

A relaxation treatment may be further carried out. In this case, the relaxation treatment is preferably carried out after it is heat-set and before the film is wound round a roll. Relaxation treatment methods include one which comprises cutting off both end portions of the film in the heat-setting zone and making the take-up speed lower than the delivery speed of the film at a temperature higher than Tg and lower than the melting temperature of the film, one which comprises heating the film with an IR heater between two carrying rolls having different speeds, one which comprises reducing the speed of a heating and carrying roll after the film is carried over the heating and carrying roll, one which comprises making the take-up speed lower than the delivery speed while the film is carried over a nozzle for blowing out hot air after heat setting, one which comprises carrying the film over a heating and carrying roll after the film is wound with a film forming machine and before a heat treatment at a temperature lower than Tg to reduce the speed of the carrying roll, or one which comprises making the roll speed after a heating zone lower than the roll speed before the heating zone while the film is carried through a heating oven or a heating zone with an IR heater. Any one of the above methods may be used. In any way, the relaxation treatment is carried out by making the take-up speed 0.1 to 10% lower than the delivery speed.

The biaxially oriented polyester film produced by the above method known per se is subjected to the above steps (1) and (2) in the order named. However, only the step (2) may be carried out when the thermal shrinkage factor of the film which has been subjected to the above relaxation treatment is 0.20% or less in both longitudinal and transverse directions after it is heated at a temperature of 150° C. for 30 minutes.

In the above step (1), the film is heated under no strain at a temperature of 150 to 180° C. for 1 to 5 hours. After the heat treatment of the step (1), the film is preferably cooled to a temperature of (Tg of film−40) to (Tg of film−5)° C. at a temperature reducing rate (gradual cooling) of 3 to 25° C./hr.

In the above step (2), the film which has been subjected to the step (1) or to the above relaxation treatment is further heated under no strain at a temperature of 80 to 122° C. for 5 to 200 hours.

This heat treatment is preferably carried out at a temperature of Tg (glass transition temperature of the polyester film) to (Tg−40)° C. When the heat treatment temperature is lower than (Tg−40)° C., a very long heat treatment time is required to develop deformation resistance at high temperatures, thereby reducing production efficiency disadvantageously. On the other hand, when the heat treatment temperature is higher than Tg of the film, the film is not suitable for use as a film for a membrane switch because it has low deformation resistance. The heat treatment time is preferably 5 to 200 hours, more preferably 8 to 170 hours from the viewpoint of production efficiency.

The heat treatment of the step (2) may be carried out at any time in the production process of a membrane switch after the step (1). When the film is exposed to a temperature higher than the heat treatment temperature after the step (2), the effect of the heat treatment is largely lost. Therefore, the film is preferably handled at a temperature lower than the heat treatment temperature after the step (2).

The step (2) may be carried out after the drying step after printing in the production process of a membrane switch. When a heat treatment at a temperature higher than Tg of the film must be carried out in this drying step, the film is preferably gradually cooled from the heat treatment temperature of the drying step before the step (2). The heat treatment method of the step (1) is, for example, one which comprises heating the film in an oven in an unrolled state, one which comprises heating the film by carrying it over a heating roll or through a heating zone with an IR heater at an extremely low speed, or the like. The method, however, is not limited to these.

The heat treatment method of the step (2) is, for example, one which comprises heating the film in an oven in a rolled or unrolled state after the film is formed, one which comprises heating the film in an oven in a rolled or unrolled state after electrodes or a spacer is placed on the film, one which comprises heating the film in an oven after a switch is assembled, or the like. The method, however, is not limited to these.

The biaxially oriented polyester film of the present invention can be used advantageously as a base film for a membrane switch.

The membrane switch produced using the biaxially oriented polyester film of the present invention is embedded in a car seat, for example. Particularly in a car equipped with an air bag, the membrane switch is advantageous when embedded in a seat to adjust the operation (especially inflation speed) of the air bag and more advantageous when used as a membrane switch having both a pressure sensor function and a start switch function. That is, membrane switches, which are scattered under a seat or which fully cover the seated area of an ordinary adult, are turned on by switching to activate the inflation speed control system of an air bag when a person is seated. The number of contacted switches or the total contact area of switches is changed according to the weight of a seated person, and each of the membrane switches has two functions, which are a start switch and a weight detection pressure sensor, in a system which sets the inflation speed of an air bag by detecting the number of contacted switches or the contact area to estimate the weight of the seated person. Therefore, it is possible to adjust the inflation speed of an air bag which works at the time of a car crash by distinguishing between an adult and a child with the membrane switch of the present invention which has the function of a pressure sensor for detecting the weight of a person.

EXAMPLES

The following examples are given to further illustrate the present invention.

(1) measurement of purity of ethylene-2,6-naphthalene dicarboxylate

After a film sample is dissolved in a measurement solvent ($CDCl_3$: $CF_3COOD$=1:1), a $^1$H-NMR measurement is carried out and the purity of ethylene-2,6-naphthalene dicarboxylate is calculated from the integral ratio of the obtained signals.

(2) glass transition temperature (Tg)

This is measured by the differential scanning calorimeter DSC220 of Seiko Instruments Inc. under the following conditions.

temperature elevation rate: 20° C./min amount of sample: 10 mg measured in a nitrogen gas stream The sample is heated and fused under the above conditions, quenched and measured again under the above conditions.

(3) endothermic peak temperature, quantity of endothermic energy

These are measured using the differential scanning calorimeter DSC220 of Seiko Instruments Inc. under the following conditions.

temperature elevation rate: 20° C./min
amount of sample: 10 mg
measured in a nitrogen gas stream The endothermic behavior of the film sample when it is heated and fused under the above conditions is analyzed with primary differentiation and secondary differentiation to determine a peak temperature.

At this point, the quantity of endothermic energy is obtained from an area on an endothermic side on the corresponding DSC chart. This area is an area on an endothermic side which is shifted toward the endothermic side from the base line by elevating temperature, shows an endothermic peak by continuing the elevation of temperature, and then returns to the base line. The area (A) is obtained by connecting the heat absorption start temperature position to the heat absorption end temperature position with a straight line. The area of In (indium) is measured with the above amount of a sample under the same DSC measurement conditions and the quantity of endothermic energy is obtained from the following expression based on the condition that this area (B) is 28.5 mJ/mg.

quantity of endothermic energy=(A/B)×28.5 (mJ/mg)

(4) Young's moduli

The film is cut to a width of 10 mm and a length of 150 mm and this sample film is pulled by an Instron-type universal tensile tester at a chuck interval of 100 mm, a pulling rate of 10 mm/min and a chart speed of 500 mm/min. Young's moduli are calculated from the tangent line of a rising portion of the obtained load-elongation curve.

(5) refractive index in thickness direction

The refractive index in a film thickness direction is obtained using an Na-D ray and an Abbe refractometer (of Atago Co., Ltd.) at 25° C. The film sample is measured for both front and rear sides, and the mean of measurement values is taken as a refractive index in a thickness direction (nz).

(6) thermal shrinkage factor

The film is held in an oven maintained at 150° C. for 30 minutes under no strain, and the dimensional change of the film before and after heating is calculated from the following expression as a thermal shrinkage factor.

thermal shrinkage factor (%)=(($L_0$-L)/$L_0$)×100

$L_0$: distance between gauge marks before heating
L: distance between gauge marks after heating (7) intrinsic viscosity This is measured at 25° C. in o-chlorophenol as a solvent (unit: dl/g).

(8) folded-line delamination whitening ratio

The film is cut to a size of 80mm×80 mm, and the obtained film sample is softly folded into two by hand, and pressed with a predetermined pressure P1 (kg/cm$^2$) by a press machine for 20 seconds. The pressed film is then unfolded to its original shape by hand and pressed with a pressure P2 (kg/cm$^2$) for 20 seconds. Thereafter, the sample is taken out and the lengths (mm) of whitened portions appearing in the fold are measured and totaled.

New film samples are folded with P1=4.2, 6.3, 8.4 and 10.5 (kg/cm$^2$), respectively, and unfolded with P2=1.26 (kg/cm$^2$), and the above measurement is made on each of the new film samples.

The proportion of the mean of the totaled lengths (mm) of whitened portions at each pressure to the total length of the fold (80 mm) is taken as a folded-line delamination whitening ratio, and this value is used as an index indicating how easily the delamination of the film occurs.

folded-line delamination whitening ratio (%)=(total of lengths of whitened portions (mm)/(80 mm×4))×100

(9) density

This is measured by a sink-float method at 25° C. in a density gradient obtained using an aqueous solution of calcium nitrate as a solvent.

(10) center line average surface roughness (Ra)

Both front and rear surfaces of the film are measured by a surface roughness meter (SURFCOM 111A of Tokyo Seimitsu Co., Ltd.) and the mean of measurement values is calculated and taken as a surface roughness.

(11) increase in deformation, amount of residual deformation

These are measured by the Thermo Mechanical Analyzer TMA/SS120C of Seiko Instruments Inc. under the following conditions.

temperature: 80° C.
load: 0.75 kg/mm$^2$
load time: 30 hours
sample width: 4 mm
sample length (chuck interval): 15 mm The above load is applied to the film sample at the above temperature, kept for a predetermined amount of time (30 hours) and then removed. The amount of deformation ($S_1$) of the film when the load begins to be applied, the amount of deformation ($S_2$) after the load is applied for the predetermined amount of time, and the amount of deformation ($S_3$) immediately after the load is removed are read to obtain an increase in deformation after the load is applied for the predetermined amount of time and the amount of residual deformation after the load is removed. The proportions of the obtained values to the length of the sample ($S_0$=chuck interval) before the application of the load are obtained from the following expressions and taken as an increase in deformation and the amount of residual deformation.

increase in deformation (%)=($S_2$-$S_1$)×100/$S_0$ amount of residual deformation (%)=$S_3$×100/$S_0$

(12) 1% elongation stress (F1 value)

The film is cut to a width of 10 mm and a length of 150 mm, and the obtained sample film is pulled by an Instron-type universal tensile tester at a chuck interval of 100 mm, a pulling rate of 10 mm/min and a chart speed of 500 mm/min. The strength of the film at the time of 1% elongation is read from the load-elongation curve obtained by carrying out measurements in both MD and TD of the film and divided by the original sectional area. The obtained value is taken as a 1% elongation stress (kg/mm$^2$).

(13) plane orientation coefficient (ns)

The refractive indices in a longitudinal direction (MD) transverse direction (TD) and thickness direction (z) of the film are obtained using an Abbe refractometer (of Atago Co., Ltd.) and an Na-D ray at 25° C. The front and rear surfaces of the film sample are measured and the means of measurement values are taken as refractive indices in longitudinal, transverse and thickness directions. The birefringence and the plane orientation coefficient (ns) are calculated from the following two expressions.

birefringence (An)=nMD−nTD plane orientation coefficient (ns)={(nMD+nTD)/2}−nz (In these expressions, nMD is a refractive index in a longitudinal direction, nTD is a refractive index in a transverse direction and nz is a refractive index in a thickness direction.)

(14) thickness and thickness non-uniformity

The thickness of the film is measured with the electronic micro-meter (K-312A) of Anritsu Co., Ltd. over a length of 2 m in both longitudinal and transverse directions at a needle pressure of 30 g and a running speed of 25 (mm/sec) to obtain a continuous thickness chart. The maximum thickness and the minimum thickness are read from this chart.

Further, the thickness of the same sample is calculated from its width (cm), length (cm), weight (g) and density (g/cm$^3$) based on the following expression and taken as an average thickness.

The proportion of the difference between the maximum thickness and the minimum thickness to the average thickness is calculated from the following two expressions and taken as thickness non-uniformity.

average thickness ($\mu$m)=(weight/(width×length×density))×10,000 thickness non-uniformity (%)=((maximum thickness−minimum thickness)/average thickness)×100

(15) evaluation on functionality of membrane switch

A predetermined pressure is applied to the membrane switch at 80° C. for 96 hours. After the temperature is reduced to 25° C. with the above pressure maintained, the pressure is removed. The measurement of each sample is carried out at n=50. After the pressure is removed, probability (number of samples whose switch portions are separate from each other/50)×100%) is calculated from the number of samples whose switch portions are separate from each other with the switch portions switched off and evaluated based on the following three grades.

○: good (probability of 95% or more) Δ: usable (probability of 80% more)

X: unusable (probability of less than 80%)

(16) film-forming properties

The film formation condition is observed to evaluate film-forming properties based on the following criteria.

◎: The film is not broken and very stable film formation is possible.

○: The film is rarely broken and stable film formation is possible.

X: The film is often broken and film formation is instable.

(17) handling properties

The handling properties of the film are evaluated based on the following criteria.

○: No blocking occurs and handling properties are satisfactory.

X: Blocking occurs and handling properties are unsatisfactory.

(18) processability

The processability of the film at the time of processing the film for a membrane switch, such as perforation, punchability and flatness is evaluated based on the following criteria.

◎: Perforation and punchability are very good, the shape of the cut end of the film is good, and the flatness of the film after a conductive paste or carbon paste is dried is high.

○: The shape of the cut end of the film may be slightly bad, or the flatness of the film after a conductive paste or carbon paste is dried may be low, but there is no practical problem.

X: Perforation and punchability are bad, the shape of the cut end is bad, or the flatness of the film after a conductive paste or carbon paste is dried is low, so that a defective product is obtained.

Example 1

Polyethylene-2,6-naphthalene dicarboxylate, which contains 0.2 wt % of silica particles having an average particle diameter of 0.3 $\mu$m and which has an intrinsic viscosity of 0.60, was melt-extruded from a die slit and solidified by cooling on a casting drum to produce an unstretched film.

This unstretched film was stretched to 3.6 times in a longitudinal direction (mechanical axis direction) and to 3.8 times in a transverse direction (breadthwise direction) sequentially and heat set to produce a 75-$\mu$m-thick biaxially oriented film, which was then wound round a roll. Thereafter, the rolled film was subjected to a relaxation treatment by making the roll speed after a heating zone 1% lower than the roll speed before the heating zone while carried through the heating zone with an IR heater.

After the obtained biaxially oriented film was left to stand at 150° C. for 30 minutes, it was found to have thermal shrinkage factors of 0.05% in a longitudinal direction and 0.02% in a transverse direction, an intrinsic viscosity of 0.55 dl/g, a density of 1.359 g/cm$^3$, a refractive index in a thickness direction of 1.498 and Young's moduli in longitudinal and transverse directions of 640 kg/mm$^2$.

A film sample of 1,000 mm in width and 2,000 m in length was cut out of the obtained biaxially oriented film and wound round a 165-mm-diameter roll to prepare a sample roll. The sample roll was subjected to a heat treatment by elevating the temperature to 115° C. over 24 hours, maintaining that temperature for 24 hours and reducing the temperature to room temperature over 24 hours. It was observed by a DSC that the heat-treated film showed an endothermic peak as well as a peak showing heat of crystal fusion. The peak temperature was 135° C. and the quantity of endothermic energy was 1.0 mJ/mg.

A silver paste and a carbon paste were screen-printed on this PEN base film to form a conductor circuit and printed contact points (electrodes), respectively, and dried at 100° C. for 20 minutes to prepare a sheet for a switch. A film-shaped styrene-butadiene resin was used as an adhesive to laminate two of the sheet together and as a spacer for a membrane switch.

Evaluation results on the physical properties of the biaxially oriented film and the functionality of the membrane switch are shown in Table 1.

Example 2

A film was formed in the same manner as in Example 1 to obtain a membrane switch except that a heat treatment was carried out at 115° C. for 8 hours after the formed film was wound round a roll. Evaluation results are shown in Table 1.

Example 3

A film was formed in the same manner as in Example 1 to obtain a membrane switch except that a heat treatment was carried out at 95° C. for 48 hours after the formed film was wound round a roll. Evaluation results are shown in Table 1.

Example 4

A membrane switch was obtained in the same manner as in Example 1 except that the formed film was dried at 150° C. for 5 minutes with electrodes and a spacer placed on the film and, as a pre-heat treatment, gradually cooled from the drying temperature to 115° C. at a cooling rate of 15° C./hr and that a heat treatment was then carried out at 115° C. for 24 hours. Evaluation results are shown in Table 1.

Example 5

A film was formed in the same manner as in Example 1 to obtain a membrane switch except that a copolyester having an intrinsic viscosity of 0.62 (a polyester comprising 90 mol % of ethylene-2,6-naphthalene dicarboxylate units and 10 mol % of bis(4-(2-ethoxy)phenyl)sulfone-2,6-naphthalene dicarboxylate units (abbreviated as BPS-EO in the table) was used as a raw material. Evaluation results are shown in Table 1.

Example 6

A film was formed in the same manner as in Example 1 to obtain a membrane switch except that a copolyester having an intrinsic viscosity of 0.60 (a polyester comprising 95 mol % of ethylene-2,6-naphthalene dicarboxylate units and 5 mol % of ethylene-4,4'-diphenyl dicarboxylate units (abbreviated as 4,4'-D in the table) was used as a raw material. Evaluation results are shown in Table 1.

Comparative Example 1

A film was formed in the same manner as in Example 1 to obtain a membrane switch except that a heat treatment was not carried out at a temperature lower than Tg of the film and higher than (Tg−40)° C. in any stage of the assembly of the membrane switch after the formed film was wound round a roll. Evaluation results are shown in Table 1. The film was poor in deformation resistance as a film for a membrane switch and the functionality of the membrane switch was unsatisfactory.

Comparative Example 2

A film was formed in the same manner as in Example 1 to obtain a membrane switch except that a heat treatment was carried out at 70° C. for 100 hours after the formed film was wound round a roll. Evaluation results are shown in Table 1. The film was unsatisfactory in terms of deformation resistance as a film for a membrane switch.

Comparative Example 3

A film was formed in the same manner as in Example 1 to obtain a membrane switch except that a heat treatment was carried out at 140° C. for 24 hours after the formed film was wound round a roll. Evaluation results are shown in Table 1. The film was unsatisfactory in terms of deformation resistance as a film for a membrane switch.

TABLE 1

| | Example.1 | Example.2 | Example.3 | Example.4 | Example.5 | Example.6 |
|---|---|---|---|---|---|---|
| main component polymer | PEN | PEN | PEN | PEN | PEN | PEN |
| molar ratio of main component mol % | 100 | 100 | 100 | 100 | 90 | 95 |
| copolymer component | — | — | — | — | BPS-EO | 4,4'-D |
| molar ratio of copolymer component mol % | — | — | — | — | 10 | 5 |
| type of lubricant | spherical silica | spherical silica | spherical silica | spherical silica | spherical silica | spherical silica |
| average particle diameter of lubricant pm | 0.3 | 0.3 | 0.3 | 0.3 | 0.3 | 0.3 |
| amount of lubricant wt % | 0.2 | 0.2 | 0.2 | 0.2 | 0.2 | 0.2 |
| stretch ratio longitudinal direction (times) | 3.6 | 3.6 | 3.6 | 3.6 | 3.6 | 3.6 |
| transverse direction (times) | 3.8 | 3.8 | 3.8 | 3.8 | 3.8 | 3.8 |
| heat setting temperature ° C. | Tg + 115 | Tg + 115 | Tg + 115 | Tg + 115 | Tg + 115 | Tg + 115 |
| thickness μm | 75 | 75 | 75 | 75 | 75 | 75 |
| refractive index in thickness direction (nz) | 1.498 | 1.498 | 1.498 | 1.498 | 1.515 | 1.510 |
| young's longitudinal direction kg/mm$^2$ | 640 | 640 | 640 | 640 | 450 | 490 |
| modulus transverse direction kg/mm$^2$ | 640 | 640 | 640 | 640 | 470 | 500 |
| intrinsic viscosity dl/g | 0.55 | 0.55 | 0.55 | 0.55 | 0.53 | 0.54 |

| | Ex. 1 | Ex. 2 | Ex. 3 | Ex. 4 | Ex. 5 | Ex. 6 |
|---|---|---|---|---|---|---|
| density g/cm$^3$ | 1.359 | 1.359 | 1.359 | 1.359 | 1.355 | 1.357 |
| thermal shrinkage factor longitudinal direction % (150° C. × 30 min) | 0.05 | 0.05 | 0.05 | 0.05 | 0.05 | 0.05 |
| transverse direction % | 0.02 | 0.02 | 0.02 | 0.02 | 0.02 | 0.02 |
| folded-line delamination whitening ratio % | 50 | 50 | 50 | 50 | 0 | 0 |
| glass transition temperature (Tg) ° C. | 122 | 122 | 122 | 122 | 119 | 120 |
| endothermic peak temperature ° C. | 135 | 125 | 120 | 145 | 135 | 135 |
| quantity of endothermic energy mJ/mg | 1.0 | 0.6 | 0.4 | 1.5 | 1.0 | 1.0 |
| heat treatment temperature ° C/hr | 115 | 115 | 95 | 115 | 115 | 115 |
| heat treatment time hr | 24 | 8 | 48 | 24 | 24 | 24 |
| starting temperature for gradual cooling ° C. | — | — | — | 150 | — | — |
| gradual cooling rate ° C./hr | — | — | — | −15 | — | — |
| heat treatment timing | After the formed film was wound up | | | After electrodes and a spacer are placed | After the formed film was wound up | |
| handling properties | ○ | ○ | ○ | ○ | ○ | ○ |
| processability | ◎ | ◎ | ◎ | ◎ | ◎ | ◎ |
| evaluation on functionality of membrane switch | ○ | ○ | Δ | ○ | ○ | ○ |
| overall evaluation | ◎ | ◎ | ○ | ◎ | ◎ | ◎ |

Ex.: Example

TABLE 1-continued

|  | Comparative Example.1 | Comparative Example.2 | Comparative Example.3 |
| --- | --- | --- | --- |
| main component polymer | PEN | PEN | PEN |
| molar ratio of main component mol % | 100 | 100 | 100 |
| copolymer component | — | — | — |
| molar ratio of copolymer component mol % | — | — | — |
| type of lubricant | spherical silica | spherical silica | spherical silica |
| average particle diameter of lubricant μm | 0.3 | 0.3 | 0.3 |
| amount of lubricant added wt % | 0.2 | 0.2 | 0.2 |
| stretch ratio  longitudinal direction (times) | 3.6 | 3.6 | 3.6 |
|  transverse direction (times) | 3.8 | 3.8 | 3.8 |
| heat setting temperature ° C. | Tg + 115 | Tg+ 115 | Tg + 115 |
| thickness μm | 75 | 75 | 75 |
| refractive index in thickness direction (nz) | 1.498 | 1.498 | 1.498 |
| young's  longitudinal direction kg/mm² | 640 | 640 | 640 |
| modulus  transverse direction kg/mm² | 640 | 640 | 640 |
| intrinsic viscosity dl/g | 0.55 | 0.55 | 0.55 |
| density g/cm³ | 1.359 | 1.359 | 1.359 |
| thermal shrinkage factor  longitudinal | 0.05 | 0.05 | 0.05 |
| (150° C. × 30 min)  direction % |  |  |  |
|  transverse direction % | 0.02 | 0.02 | 0.02 |
| folded-line delamination whitening ratio % | 50 | 50 | 50 |
| glass transition temperature (Tg) ° C. | 122 | 122 | 122 |
| endothermic peak temperature ° C. | — | 100 | 165 |
| quantity of endothermic energy mJ/mg | — | 0.2 | 1.5 |
| heat treatment temperature ° C. | — | 70 | 140 |
| heat treatment time hr | — | 100 | 24 |
| temperature for starting gradual cooling ° C. | — | — | — |
| gradual cooling rate ° C./hr | — | — | — |
| heat treatment timing | No treatment | After the formed film was wound up |  |
| handling properties | ○ | ○ | ○ |
| processability | ⊚ | ⊚ | ⊚ |
| evaluation on functionality of membrane switch | X | X | X |
| overall evaluation | X | X | X |

Example 7

After an ester interchange reaction was carried out between 100 parts of dimethyl 2,6-naphthalene dicarboxylate and 60 parts of ethylene glycol in the presence of 0.03 part of manganese acetate tetrahydrate as an ester interchange catalyst in accordance with a commonly used method by adding 0.2 wt % of spherical silica particles having an average particle diameter of 0.3 μm as a lubricant, 0.023 part of trimethyl phosphate was added to substantially terminate the ester interchange reaction.

Thereafter, 0.024 part of antimony trioxide was added and a polymerization reaction was carried out at a high temperature and a high degree of vacuum in accordance with a commonly used method to produce polyethylene-2,6-naphthalene dicarboxylate (PEN Tg=122° C.) having an intrinsic viscosity of 0.62 dl/g. This silica particle-containing PEN was melt-extruded from a die slit and solidified by cooling on a casting drum to produce an unstretched film.

This unstretched film was stretched to 3.5 times in a longitudinal direction (mechanical axis direction) and to 3.7 times in a transverse direction (breadthwise direction) sequentially and heat set to produce a 100-μm-thick biaxially oriented film, which was then wound round a roll. Thereafter, the rolled film was subjected to a relaxation treatment by making the roll speed after a heating zone 0.2% lower than the roll speed before the heating zone while carried through the heating zone with an IR heater.

The obtained biaxially oriented film was unrolled, sampled and subjected to a heat treatment at 170° C. for 1 hour.

A silver paste and a carbon paste were screen-printed on this PEN base film to form a conductor circuit and printed contact points (electrodes), respectively, and dried at 100° C. for 20 minutes to produce a sheet for a switch. A film-like styrene-butadiene resin was used as an adhesive to laminate two of the sheet together and a spacer for a membrane switch.

After the membrane switch is assembled, the switch was heated in an oven maintained at 115° C. for 24 hours.

Evaluation results on the physical properties of the biaxially oriented film and the functionality of the membrane switch are shown in Table 2.

Examples 8 and 9

Films were formed in the same manner as in Example 7 except that a heat treatment temperature or time after the assembly of a switch was changed as shown in Table 2. Results are shown in Table 2.

Example 10

A film was formed in the same manner as in Example 7 except that a heat treatment at a temperature lower than Tg was carried out before a circuit and electrodes were printed. Results are shown in Table 2.

Example 11

After a circuit and electrodes were printed and dried at 150° C. for 5 minutes in Example 7, the temperature was gradually lowered from the drying temperature to 115° C. at a cooling rate of 15° C./hr as a pre-heat treatment and a heat treatment was further carried out at 115° C. for 24 hours. Results are shown in Table 2.

Examples 12 and 13

Films were formed in the same manner as in Example 7 except that film forming conditions were changed as shown in Table 2. Results are shown in Table 2.

Example 14

A film was formed in the same manner as in Example 7 except that a 4% relaxation treatment was carried out only in a transverse direction at a temperature 15° C. lower than the heat setting temperature after the formed film was heat set. Film forming conditions and results are shown in Table 2.

Example 15

A film was formed in the same manner as in Example 7 except that polyethylene-2,6-naphthalene dicarboxylate (PEN Tg=120° C.), containing silica particles and having an intrinsic viscosity of 0.54 dl/g, was melt-extruded from a die slit. Film forming conditions and results are shown in Table 2.

Example 16

A film was formed in the same manner as in Example 7 except that heat setting temperature for forming the film was changed as shown in Table 2. Film forming conditions and results are shown in Table 2.

Example 17

A film was formed in the same manner as in Example 7 except that polyethylene-2,6-naphthalene dicarboxylate (PEN Tg=122° C.), containing 0.3 wt % of spherical silica particles having an average particle diameter of 1.5 $\mu$m as a lubricant and having an intrinsic viscosity of 0.62 dl/g, was used. Film forming conditions and results are shown in Table 2.

Example 18

After an ester interchange reaction was carried out among 89 parts of dimethyl 2,6-naphthalene dicarboxylate, 11 parts of dimethyl terephthalate (may be abbreviated as TA hereinafter) and 60 parts of ethylene glycol in the presence of 0.03 part of manganese acetate tetrahydrate as an ester interchange catalyst in accordance with a commonly used method by adding 0.2 wt % of spherical silica particles having an average particle diameter of 0.3 $\mu$m as a lubricant, 0.023 part of trimethyl phosphate was added to substantially terminate the ester interchange reaction.

Thereafter, 0.024 part of antimony trioxide was added, and a polymerization reaction was carried out at a high temperature and a high degree of vacuum in accordance with a commonly used method to produce copolyethylene-2,6-naphthalate (TA-copolymerized PEN Tg=113° C.) having an intrinsic viscosity of 0.60 dl/g.

This copolyester was melt-extruded from a die slit as a raw material and solidified by cooling on a casting drum to produce an unstretched film. This unstretched film was sequentially biaxially oriented in the same manner as in Example 7 under the film forming conditions shown in Table 2 to produce a biaxially oriented film. A membrane switch was fabricated using the obtained biaxially oriented film in the same manner as in Example 7 and heated at 105° C. for 24 hours. Results are shown in Table 2.

TABLE 2

|  | Ex. 7 | Ex. 8 | Ex. 9 | Ex. 10 | Ex. 11 | Ex. 12 |
|---|---|---|---|---|---|---|
| main component polymer | PEN | PEN | PEN | PEN | PEN | PEN |
| molar ratio of main component mol % | 100 | 100 | 100 | 100 | 100 | 100 |
| copolymer component | — | — | — | — | — | — |
| molar ratio of copolymer component mol % | — | — | — | — | — | — |
| type of lubricant | spherical silica | spherical silica | spherical silica | spherical silica | spherical silica | spherical silica |
| average particle diameter of lubricant $\mu$m | 0.3 | 0.3 | 0.3 | 0.3 | 0.3 | 0.3 |
| amount of lubricant added wt % | 0.2 | 0.2 | 0.2 | 0.2 | 0.2 | 0.2 |
| stretch ratio   longitudinal direction (times) | 3.5 | 3.5 | 3.5 | 3.5 | 3.5 | 2.5 |
|                transverse direction (times) | 3.7 | 3.7 | 3.7 | 3.7 | 3.7 | 2.5 |
| heat setting temperature ° C. | Tg + 120 | Tg + 120 | Tg + 120 | Tg + 120 | Tg + 120 | Tg + 120 |
| thickness $\mu$m | 100 | 100 | 100 | 100 | 100 | 100 |
| thickness non-uniformity % | 4 | 4 | 4 | 4 | 4 | 7 |
| F1 value   longitudinal direction kg/mm$^2$ | 6.1 | 6.1 | 6.1 | 6.1 | 6.1 | 5.3 |
|            transverse direction kg/mm$^2$ | 6.2 | 6.2 | 6.2 | 6.2 | 6.2 | 5.3 |
| intrinsic viscosity dl/g | 0.53 | 0.53 | 0.53 | 0.53 | 0.53 | 0.53 |
| density g/cm$^3$ | 1.360 | 1.360 | 1.360 | 1.360 | 1.360 | 1.361 |
| surface roughness (Ra) nm | 10 | 10 | 10 | 10 | 10 | 10 |

Ex.: Example

|  |  | Example.7 | Example.8 | Example.9 | Example.10 | Example.11 | Example.12 |
|---|---|---|---|---|---|---|---|
| increase in deformation | longitudinal direction % | 0.030 | 0.040 | 0.050 | 0.030 | 0.020 | 0.030 |
|  | transverse direction % | 0.030 | 0.040 | 0.050 | 0.030 | 0.020 | 0.030 |
| amount of residual deformation | longitudinal direction % | 0.050 | 0.060 | 0.070 | 0.050 | 0.040 | 0.050 |
|  | transverse direction % | 0.050 | 0.060 | 0.070 | 0.050 | 0.040 | 0.050 |
| glass transition temperature (Tg) ° C. |  | 1.22 | 122 | 122 | 122 | 122 | 122 |
| endothermic peak temperature ° C. |  | 135 | 130 | 125 | 135 | 150 | 135 |
| quantity of endothermic energy mJ/mg |  | 1.2 | 0.7 | 0.5 | 1.2 | 2.5 | 1.2 |
| heat treatment temperature ° C. |  | 115 | 115 | 100 | 115 | 115 | 115 |
| heat treatment time hr |  | 24 | 8 | 100 | 24 | 24 | 24 |
| temperature for starting gradual cooling ° C. |  | — | — | — | — | 150 | — |
| gradual cooling rate ° C./hr |  | — | — | — | — | 15 | — |
| heat treatment timing |  | after the assembly of the switch | after the assembly of the switch | after the assembly of the switch electrodes | before printing of a circuit and circuit and electrodes | after printing and drying of a circuit and electrodes | after the assembly of the switch |

TABLE 2-continued

|  | Ex. 13 | Ex. 14 | Ex. 15 | Ex. 16 | Ex. 17 | Ex. 18 |
|---|---|---|---|---|---|---|
| drying temperature after printing of a circuit and electrodes (° C.) | 100 | 100 | 100 | 100 | 150 | 100 |
| film-forming property | ◎ | ◎ | ◎ | ◎ | ◎ | ◎ |
| processability | ◎ | ◎ | ◎ | ◎ | ◎ | ◎ |
| evaluation on functionality of membrane switch | ○ | ○ | ○ | ○ | ○ | ○ |
| overall evaluation | ◎ | ◎ | ◎ | ◎ | ◎ | ◎ |

Ex: Example

|  | Ex. 13 | Ex. 14 | Ex. 15 | Ex. 16 | Ex. 17 | Ex. 18 |
|---|---|---|---|---|---|---|
| main component polymer | PEN | PEN | PEN | PEN | PEN | PEN |
| molar ratio of main component mol % | 100 | 100 | 100 | 100 | 100 | 85 |
| copolymer component | — | — | — | — | — | TA |
| molar ratio of copolymer component mol % | — | — | — | — | — | 15 |
| type of lubricant | spherical silica | spherical silica | spherical silica | spherical silica | spherical silica | spherical silica |
| average particle diameter of lubricant μm | 0.3 | 0.3 | 0.3 | 0.3 | 1.5 | 0.3 |
| amount of lubricant added wt % | 0.2 | 0.2 | 0.2 | 0.2 | 0.3 | 0.2 |
| stretch ratio longitudinal direction (times) | 4.2 | 3.5 | 3.5 | 3.5 | 3.5 | 3.7 |
| transverse direction (times) | 4.3 | 3.7 | 3.7 | 3.7 | 3.7 | 3.9 |
| heat setting temperature ° C. | Tg + 120 | Tg + 120 | Tg + 120 | Tg + 85 | Tg + 120 | Tg + 120 |
| thickness μm | 100 | 100 | 100 | 100 | 100 | 100 |
| thickness non-uniformity % | 3 | 4 | 4 | 4 | 4 | 5 |
| F1 value longitudinal direction kg/mm$^2$ | 6.5 | 6.1 | 6.2 | 6.3 | 6.1 | 5.5 |
| transverse direction kg/mm$^2$ | 6.5 | 6.1 | 6.2 | 6.3 | 6.2 | 5.6 |
| intrinsic viscosity dl/g | 0.53 | 0.53 | 0.46 | 0.53 | 0.53 | 0.51 |
| density g/cm$^3$ | 1.359 | 1.360 | 1.361 | 1.352 | 1.361 | 1.355 |
| surface roughness (Ra) nm | 10 | 10 | 10 | 10 | 80 | 10 |

Ex.: Example

|  | Example.13 | Example.14 | Example.15 | Example.16 | Example.17 | Example.18 |
|---|---|---|---|---|---|---|
| increase in longitudinal direction % | 0.030 | 0.035 | 0.030 | 0.060 | 0.030 | 0.067 |
| deformation transverse direction % | 0.030 | 0.030 | 0.030 | 0.060 | 0.036 | 0.067 |
| amount of longitudinal direction % | 0.050 | 0.055 | 0.048 | 0.080 | 0.050 | 0.085 |
| residual transverse direction % | 0.050 | 0.050 | 0.048 | 0.080 | 0.050 | 0.085 |
| deformation |  |  |  |  |  |  |
| glass transition temperature (Tg) ° C. | 122 | 122 | 120 | 122 | 122 | 113 |
| endothermic peak temperature ° C. | 135 | 135 | 135 | 133 | 135 | 125 |
| quantity of endothermic energy mJ/mg | 1.0 | 1.1 | 1.3 | 0.7 | 1.2 | 1.4 |
| heat treatment temperature ° C. | 115 | 115 | 115 | 115 | 115 | 105 |
| heat treatment time hr | 24 | 24 | 24 | 24 | 24 | 24 |
| temperature for starting gradual cooling ° C. | — | — | — | — | — | — |
| gradual cooling rate ° C./hr | — | — | — | — | — | — |
| heat treatment timing | after the assembly of the switch | after the assembly of the switch | after the assembly of the switch | after the assembly of the switch | after the assembly of the switch | after the assembly of the switch |
| drying temperature after printing of a circuit and electrodes (° C.) | 100 | 100 | 100 | 100 | 100 | 100 |
| film-forming property | ◎ | ◎ | ◎ | ◎ | ◎ | ○ |
| processability | ◎ | ○ | ◎ | ○ | ◎ | ◎ |
| evaluation on functionality of membrane switch | ○ | ○ | ○ | ○ | ○ | Δ |
| overall evaluation | ◎ | ○ | ◎ | ○ | ◎ | ○ |

Example 19

After an ester interchange reaction was carried out between 100 parts of dimethyl 2,6-naphthalene dicarboxylate and 60 parts of ethylene glycol in the presence of 0.03 part of manganese acetate tetrahydrate as an ester interchange catalyst in accordance with a commonly used method by adding 0.25 wt % of silica particles having an average particle diameter of 0.3 μm as a lubricant, 0.023 part of trimethyl phosphate was added to substantially terminate the ester interchange reaction.

Thereafter, 0.024 part of antimony trioxide was added, and a polymerization reaction was carried out at a high temperature and a high degree of vacuum in accordance with a commonly used method to produce polyethylene-2,6-naphthalene dicarboxylate (PEN Tg=121° C.) having an intrinsic viscosity of 0.62 dl/g. This silica particle-containing PEN was melt-extruded from a die slit and solidified by cooling on a casting drum to produce an unstretched film.

This unstretched film was stretched to 3.5 times in a longitudinal direction (mechanical axis direction) and to 3.6 times in a transverse direction (breadthwise direction) sequentially and heat set to produce a 75-μm-thick biaxially oriented film, which was then wound round a roll. Thereafter, the rolled film was subjected to a relaxation treatment by making the roll speed after a heating zone 0.3% lower than the roll speed before the heating zone while carried through the heating zone (185° C.) with an IR heater for the purpose of increasing the dimensional stability of the film and facilitating the exhibition of an effect by heat treatment at a temperature lower than Tg. A film sample of 1,000 mm in width and 2,000 m in length was cut out of the obtained biaxially oriented film and wound round a 165-mm-diameter roll to prepare a sample roll. This sample roll was heated in an oven maintained at 115° C. for 24 hours to produce a film for a membrane switch.

A silver paste and a carbon paste were screen-printed on this PEN base film to form a conductor circuit and printed contact points (electrodes), respectively, and dried at 110° C. for 20 minutes to produce a sheet for a switch. A film-like styrene-butadiene resin was used as an adhesive to laminate two of the sheet together and as a spacer for a membrane switch.

Evaluation results on the physical properties of the biaxially oriented film and the functionality of the membrane switch are shown in Table 3.

Examples 20 to 23

Films were formed and a heat treatment was carried out in the same manner as in Example 19 except that film forming conditions were changed as shown in Table 3. Results are shown in Table 3.

Examples 24 and 25

Films were formed and a heat treatment was carried out in the same manner as in Example 19 except that the types and amounts of lubricants added were changed. Results are shown in Table 3.

Example 26

A film was formed and a heat treatment was carried out in the same manner as in Example 19 except that film forming conditions were changed as shown in Table 3 and that a 4% relaxation treatment was carried out only in a transverse direction at a temperature 10° C. lower than the heat setting temperature after heat setting. Film forming conditions and results are shown in Table 3.

Example 27

A film was formed in the same manner as in Example 19 except that the heat treatment time at 115° C. was changed to 7 hours. Results are shown in Table 3.

Example 28

After an ester interchange reaction was carried out among 89 parts of dimethyl 2,6-naphthalene dicarboxylate, 11 parts of dimethyl isophthalate (may be abbreviated as IA hereinafter) and 60 parts of ethylene glycol in the presence of 0.03 part of manganese acetate tetrahydrate as an ester interchange catalyst in accordance with a commonly used method by adding 0.25 wt % of silica particles having an average particle diameter of 0.3 $\mu$m as a lubricant, 0.023 part of trimethyl phosphate was added to substantially terminate the ester interchange reaction.

Thereafter, 0.024 part of antimony trioxide was added, and a polymerization reaction was carried out at a high temperature and a high degree of vacuum in accordance with a commonly used method to produce copolyethylene-2,6-naphthalate (IA-copolymerized PEN Tg=115° C.) having an intrinsic viscosity of 0.61 dl/g.

This co-PET was melt-extruded from a die slit and solidified by cooling on a casting drum to produce an unstretched film. The unstretched film was sequentially biaxially oriented in the same manner as in Example 19 under the film forming conditions shown in Table 3 to produce a biaxially oriented film. The biaxially oriented film was then subjected to a relaxation treatment and a heat treatment at 115° C. in the same manner as in Example 19. Results are shown in Table 3.

TABLE 3

|  | Ex. 19 | Ex. 20 | Ex. 21 | Ex. 22 | Ex. 23 |
|---|---|---|---|---|---|
| main component polymer | PEN | PEN | PEN | PEN | PEN |
| molar ratio of main component mol % | 100 | 100 | 100 | 100 | 100 |
| copolymer component | — | — | — | — | — |
| molar ratio of copolymer component mol % | — | — | — | — | — |
| glass transition temperature of polymer (° C.) | 121 | 121 | 121 | 121 | 121 |
| type of lubricant | spherical silica | spherical silica | spherical silica | spherical silica | spherical silica |
| average particle diameter of lubricant $\mu$m | 0.3 | 0.3 | 0.3 | 0.3 | 0.3 |
| amount of lubricant added wt % | 0.25 | 0.25 | 0.25 | 0.25 | 0.25 |
| stretch ratio longitudinal direction (times) | 3.5 | 2.8 | 4.4 | 3.5 | 3.3 |
| transverse direction (times) | 3.6 | 3.0 | 4.5 | 3.6 | 3.4 |
| heat setting temperature (° C.) | Tg + 118 | Tg + 118 | Tg + 118 | Tg + 135 | Tg + 90 |
| thickness $\mu$m | 75 | 75 | 75 | 75 | 75 |
| thickness non-uniformity % | 4 | 6 | 3 | 6 | 3 |
| refractive index in thickness direction (nz) | 1.498 | 1.510 | 1.495 | 1.506 | 1.495 |

Ex.: Example

|  |  | Example.19 | Example.20 | Example.21 | Example.22 | Example.23 |
|---|---|---|---|---|---|---|
| F1 value | longitudinal direction kg/mm$^2$ | 3.3 | 2.9 | 3.5 | 3.2 | 3.5 |
| at 80° C. | transverse direction kg/mm$^2$ | 3.4 | 3.0 | 3.6 | 3.2 | 3.5 |
| breaking | longitudinal direction % | 80 | 110 | 65 | 110 | 100 |
| extension | transverse direction % | 90 | 130 | 65 | 110 | 120 |
| intrinsic viscosity dl/g |  | 0.54 | 0.54 | 0.54 | 0.54 | 0.54 |
| density g/cm$^3$ |  | 1.360 | 1.361 | 1.359 | 1.366 | 1.354 |
| thermal shrinkage factor | longitudinal direction % | 0.15 | 0.10 | 0.25 | 0.02 | 0.20 |
| (150° C. × 30 min) | transverse direction % | 0.05 | 0.05 | 0.10 | 0.01 | 0.10 |
| surface roughness (Ra) nm |  | 15 | 15 | 15 | 15 | 15 |
| moisture-vapor transmission g/m$^2$ mm 24 hr |  | 0.17 | 0.17 | 0.17 | 0.13 | 0.21 |
| endothermic peak temperature ° C. |  | 130 | 133 | 128 | 135 | 129 |
| quantity of endothermic energy mJ/mg |  | 1.1 | 1.2 | 0.9 | 1.2 | 1.0 |
| film-forming properties |  | ⊚ | ⊚ | ○ | ⊚ | ⊚ |
| handling properties |  | ○ | ○ | ○ | ○ | ○ |
| processability |  | ⊚ | ⊚ | ○ | ○ | ○ |
| evaluation on functionality of membrane |  | ○ | ○ | ○ | ○ | ○ |

TABLE 3-continued

| | Ex. 24 | Ex. 25 | Ex. 26 | Ex. 27 | Ex. 28 |
|---|---|---|---|---|---|
| switch overall evaluation | ◉ | ◉ | ○ | ○ | ○ |

| | Ex. 24 | Ex. 25 | Ex. 26 | Ex. 27 | Ex. 28 |
|---|---|---|---|---|---|
| main component polymer | PEN | PEN | PEN | PEN | PEN |
| molar ratio of main component mol % | 100 | 100 | 100 | 100 | 85 |
| copolymer component | — | — | — | — | IA |
| molar ratio of copolymer component mol % | — | — | — | — | 15 |
| glass transition temperature of polymer (° C.) | 121 | 121 | 121 | 121 | 115 |
| type of lubricant | spherical silica | spherical silica | spherical silica | spherical silica | spherical silica |
| average particle diameter of lubricant μm | 1.5 | 2.5 | 0.3 | 0.3 | 0.3 |
| amount of lubricant added wt % | 0.4 | 0.3 | 0.25 | 0.25 | 0.25 |
| stretch ratio longitudinal direction (times) | 3.5 | 3.5 | 3.4 | 3.5 | 3.5 |
| transverse direction (times) | 3.6 | 3.6 | 3.5 | 3.6 | 3.6 |
| heat setting temperature (° C.) | Tg + 118 | Tg + 118 | Tg + 125 | Tg + 118 | Tg + 118 |
| thickness μm | 75 | 75 | 75 | 75 | 75 |
| thickness non-uniformity % | 4 | 4 | 4 | 4 | 6 |
| refractive index in thickness direction (nz) | 1.498 | 1.498 | 1.501 | 1.498 | 1.513 |

Ex.: Example

| | Example.24 | Example.25 | Example.26 | Example.27 | Example.28 |
|---|---|---|---|---|---|
| F1 value longitudinal direction kg/mm$^2$ at 80° C. | 3.3 | 3.3 | 3.2 | 3.3 | 2.9 |
| transverse direction kg/mm$^2$ | 3.4 | 3.4 | 3.3 | 3.4 | 2.9 |
| breaking longitudinal direction % | 80 | 80 | 90 | 80 | 130 |
| extension transverse direction % | 90 | 90 | 100 | 90 | 140 |
| intrinsic viscosity dl/g | 0.54 | 0.54 | 0.54 | 0.54 | 0.51 |
| density g/cm$^3$ | 1.360 | 1.360 | 1.361 | 1.360 | 1.356 |
| thermal shrinkage factor (150° C. × 30 min) longitudinal direction % | 0.15 | 0.15 | 0.20 | 0.15 | 0.15 |
| transverse direction % | 0.05 | 0.05 | 0.05 | 0.05 | 0.10 |
| surface roughness (Ra) nm | 90 | 150 | 15 | 15 | 15 |
| moisture-vapor transmission g/m$^2$ mm 24 hr | 0.17 | 0.17 | 0.17 | 0.17 | 0.19 |
| endothermic peak temperature ° C. | 130 | 130 | 131 | 124 | 130 |
| quantity of endothermic energy mJ/mg | 1.1 | 1.1 | 0.8 | 0.4 | 1.4 |
| film-forming properties | ◉ | ◉ | ◉ | ◉ | ○ |
| handling properties | ○ | ○ | ○ | ○ | ○ |
| processability | ◉ | ◉ | ○ | ◉ | ◉ |
| evaluation on functionality of membrane switch | ○ | ○ | ○ | Δ | Δ |
| overall evaluation | ◉ | ◉ | ○ | ○ | ○ |

Example 29

After an ester interchange reaction was carried out between 100 parts of dimethyl 2,6-naphthalene dicarboxylate and 60 parts of ethylene glycol in the presence of 0.03 part of manganese acetate tetrahydrate as an ester interchange catalyst in accordance with a commonly used method by adding 0.25 wt % of silica particles having an average particle diameter of 0.3 μm as a lubricant, 0.023 part of trimethyl phosphate was added to substantially terminate the ester interchange reaction.

Thereafter, 0.024 part of antimony trioxide was added, and a polymerization reaction was carried out at a high temperature and a high degree of vacuum in accordance with a commonly used method to produce polyethylene-2,6-naphthalene dicarboxylate (PEN Tg=121° C.) having an intrinsic viscosity of 0.62 dl/g. This silica particle-containing PEN was melt-extruded from a die slit and solidified by cooling on a casting drum to produce an unstretched film.

This unstretched film was stretched to 3.4 times in a longitudinal direction (mechanical axis direction) and to 3.5 times in a transverse direction (breadthwise direction) sequentially and heat set to produce a 75-μm-thick biaxially oriented film, which was then wound round a roll. Thereafter, the rolled film was subjected to a relaxation treatment by making the roll speed after a heating zone 0.2% lower than the roll speed before the heating zone while carried through the heating zone (185° C.) with an IR heater for the purpose of increasing the dimensional stability of the film and facilitating the exhibition of an effect by heat treatment at a temperature lower than Tg. A film sample of 1,000 mm in width and 2,000 m in length was cut out of the obtained biaxially oriented film and wound round a 165-mm-diameter roll to prepare a sample roll. The sample roll was subjected to a heat treatment by elevating the temperature to 110° C. over 24 hours, maintaining that temperature for 24 hours and reducing the temperature to room temperature over 24 hours.

A silver paste and a carbon paste were screen-printed on this PEN base film to form a conductor circuit and printed contact points (electrodes), respectively, and dried at 110° C. for 20 minutes to produce a sheet for a switch. A film-like styrene-butadiene resin was used as an adhesive to laminate two of the sheet together and as a spacer for a membrane switch.

Evaluation results on the physical properties of the biaxially oriented film and the functionality of the membrane switch are shown in Table 4.

Examples 30 to 33

Films were formed and a heat treatment was carried out in the same manner as in Example 29 except that film forming conditions were changed as shown in Table 4. Results are shown in Table 4.

Example 34

After an ester interchange reaction was carried out among 89 parts of dimethyl 2,6-naphthalene dicarboxylate, 11 parts of dimethyl terephthalate (may be abbreviated as TA hereinafter) and 60 parts of ethylene glycol in the presence of 0.03 part of manganese acetate tetrahydrate as an ester interchange catalyst in accordance with a commonly used method by adding 0.25 wt % of silica particles having an average particle diameter of 0.3 μm as a lubricant, 0.023 part of trimethyl phosphate was added to substantially terminate the ester interchange reaction.

Thereafter, 0.024 part of antimony trioxide was added, and a polymerization reaction was carried out at a high temperature and a high degree of vacuum in accordance with a commonly used method to produce copolyethylene-2,6-naphthalate (TA-copolymerized PEN Tg=113° C.) having an intrinsic viscosity of 0.61 dl/g.

This copolyester was melt-extruded from a die slit and solidified by cooling on a casting drum to produce an unstretched film. The unstretched film was sequentially biaxially oriented in the same manner as in Example 29 under the film forming conditions shown in Table 4 to produce a biaxially oriented film. Thereafter, the biaxially oriented film was subjected to a relaxation treatment while carried through a heating zone with an IR heater and then to a heat treatment at 110° C. in the same manner as in Example 29. Results are shown in Table 4.

Example 35

After an ester interchange reaction was carried out between 100 parts of dimethyl 2,6-naphthalene dicarboxylate and 60 parts of ethylene glycol in the presence of 0.03 part of manganese acetate tetrahydrate as an ester interchange catalyst in accordance with a commonly used method by adding 0.2 wt % of silica particles having an average particle diameter of 0.3 μm as a lubricant, 0.023 part of trimethyl phosphate was added to substantially terminate the ester interchange reaction.

Thereafter, 0.024 part of antimony trioxide was added, and a polymerization reaction was carried out at a high temperature and a high degree of vacuum in accordance with a commonly used method to produce polyethylene-2,6-naphthalene dicarboxylate (PEN Tg=121° C.) having an intrinsic viscosity of 0.62 dl/g. This silica particle-containing PEN was melt-extruded from a die slit and solidified by cooling on a casting drum to produce an unstretched film.

After the unstretched film was stretched to 3.3 times in a longitudinal direction (mechanical axis direction) and to 3.4 times in a transverse direction (breadthwise direction) sequentially while the same quantity of heat was applied to the front and rear sides of the film, the stretched film was heat set to produce a 75-μm-thick biaxially oriented film, which was then wound round a roll. Thereafter, the rolled film was subjected to a relaxation treatment by making the roll speed after a heating zone 0.2% lower than the roll speed before the heating zone while carried through the heating zone with an IR heater. The obtained film was heated in an unrolled state at 170° C. for 2 hours and then at 105° C. for 16 hours.

TABLE 4

|  |  | Ex. 29 | Ex. 30 | Ex. 31 | Ex. 32 | Ex. 33 | Ex. 34 |
| --- | --- | --- | --- | --- | --- | --- | --- |
| main component polymer |  | PEN | PEN | PEN | PEN | PEN | PEN |
| molar ratio of main component mol % |  | 100 | 100 | 100 | 100 | 100 | 85 |
| copolymer component |  | — | — | — | — | — | TA |
| molar ratio of copolymer component mol % |  | — | — | — | — | — | 15 |
| glass transition temperature of polymer (° C.) |  | 121 | 121 | 121 | 121 | 121 | 113 |
| type of lubricant |  | spherical silica | spherical silica | spherical silica | spherical silica | spherical silica | spherical silica |
| average particle diameter of lubricant μm |  | 0.3 | 0.3 | 0.3 | 0.3 | 0.3 | 0.3 |
| amount of lubricant added wt % |  | 0.25 | 0.25 | 0.25 | 0.25 | 0.25 | 0.25 |
| stretch ratio | longitudinal direction (times) | 3.4 | 3.3 | 3.5 | 3.4 | 3.4 | 3.5 |
|  | transverse direction (times) | 3.5 | 4.1 | 3.5 | 3.5. | 3.5 | 3.6 |
| heat setting temperature (° C.) |  | Tg + 115 | Tg + 115 | Tg + 115 | Tg + 105 | Tg + 130 | Tg + 115 |
| thickness μm |  | 75 | 75 | 75 | 75 | 75 | 75 |
| thickness non-uniformity % |  | 4 | 4 | 4 | 3 | 4 | 6 |
| birefringence (Δn) |  | −0.020 | −0.065 | 0.015 | −0.025 | −0.008 | −0.012 |
| plane orientation coefficient (ns) |  | 0.255 | 0.261 | 0.256 | 0.252 | 0.249 | 0.248 |
| young's modulus | longitudinal direction kg/mm$^2$ | 585 | 570 | 600 | 600 | 560 | 520 |
|  | transverse direction kg/mm$^2$ | 590 | 640 | 590 | 615 | 575 | 540 |
| intrinsic viscosity dl/g |  | 0.54 | 0.54 | 0.54 | 0.54 | 0.54 | 0.51 |
| density g/m$^3$ |  | 1.358 | 1.359 | 1.358 | 1.356 | 1.362 | 1.354 |
| thermal shrinkage factor | longitudinal direction % | 0.05 | 0.05 | 0.05 | 0.13 | 0.03 | 0.15 |
| (150° C. × 30 min) | transverse direction % | 0.01 | 0.01 | 0.01 | 0.05 | 0.01 | 0.19 |
| surface roughness (Ra) nm |  | 15 | 15 | 15 | 15 | 15 | 15 |
| moisture-vapor transmission g/m$^2$ mm 24 hr |  | 0.18 | 0.18 | 0.18 | 0.20 | 0.14 | 0.22 |
| endothermic peak temperature ° C. |  | 1.30 | 130 | 130 | 130 | 130 | 130 |
| quantity of endothermic energy mJ/mg |  | 1.0 | 0.8 | 1.0 | 1.0 | 1.2 | 1.5 |
| handling properties |  | ○ | ○ | ○ | ○ | ○ | ○ |
| processability |  | ⊚ | ⊚ | ⊚ | ○ | ⊚ | ⊚ |
| evaluation on functionality of membrane switch |  | ○ | ○ | ○ | ○ | ○ | Δ |
| overall evaluation |  | ⊚ | ⊚ | ⊚ | ⊚ | ⊚ | ○ |

Ex.: Example

A silver paste and a carbon paste were screen-printed on this PEN base film to form a conductor circuit and printed contact points (electrodes), respectively, and dried at 100° C. for 20 minutes to produce a sheet for a switch. A film-like styrene-butadiene resin was used as an adhesive to laminate two of the sheet together and as a spacer for a membrane switch.

Evaluation results on the physical properties of the biaxially oriented film and the functionality of the membrane switch are shown in Table 5.

Example 36

A film was formed in the same manner as in Example 35 except that the heat treatment time at 105° C. was changed to 8 hours, and the formed film was subjected to a relaxation treatment and a heat treatment at 170° C. Results are shown in Table 5.

Example 37

A film was formed in the same manner as in Example 35 except that film forming conditions were changed as shown in Table 5, and the formed film was subjected to a relaxation treatment, a heat treatment at 170° C. and a heat treatment at 105° C. Results are shown in Table 5.

Example 38

A film was formed in the same manner as in Example 35 except that the film was stretched in a longitudinal direction with the quantity of heat 1.6 times as large as that applied to its rear side applied to its front side and that other film forming conditions were changed as shown in Table 5, and the formed film was subjected to a relaxation treatment, a heat treatment at 170° C. and a heat treatment at 105° C. Results are shown in Table 5.

Example 39

After an ester interchange reaction was carried out among 89 parts of dimethyl 2,6-naphthalene dicarboxylate, 11 parts of dimethyl terephthalate (may be abbreviated as TA hereinafter) and 60 parts of ethylene glycol in the presence of 0.03 part of manganese acetate tetrahydrate as an ester interchange catalyst in accordance with a commonly used method by adding 0.2wt % of silica particles having an average particle diameter of 0.3 μm as a lubricant, 0.023 part of trimethyl phosphate was added to substantially terminate the ester interchange reaction.

Thereafter, 0.024 part of antimony trioxide was added, and a polymerization reaction was carried out at a high temperature and a high degree of vacuum in accordance with a commonly used method to produce copolyethylene-2,6-naphthalate (TA-copolymerized PEN Tg=113° C.) having an intrinsic viscosity of 0.61 dl/g.

This copolyester was melt-extruded from a die slit as a raw material and solidified by cooling on a casting drum to produce an unstretched film. The unstretched film was sequentially biaxially oriented in the same manner as in Example 37 under the film forming conditions shown in Table 5 to produce a biaxially oriented film. Thereafter, the film was subjected to a relaxation treatment while carried through a heating zone with an IR heater in the same manner as in Example37. The obtained film was heated in an unrolled state at 170° C. for 2 hours and then at 105° C. for 16 hours. Results are shown in Table 5.

TABLE 5

|  |  | Ex. 35 | Ex. 36 | Ex. 37 | Ex. 38 | Ex. 39 |
| --- | --- | --- | --- | --- | --- | --- |
| main component polymer |  | PEN | PEN | PEN | PEN | PEN |
| molar ratio of main component mol % |  | 100 | 100 | 100 | 100 | 85 |
| copolymer component |  | — | — | — | — | TA |
| molar ratio of copolymer component mol % |  | — | — | — | — | 15 |
| glass transition temperature of polymer (° C.) |  | 121 | 121 | 121 | 121 | 113 |
| type of lubricant |  | spherical silica | spherical silica | spherical silica | spherical silica | spherical silica |
| average particle diameter of lubricant μm |  | 0.3 | 0.3 | 0.3 | 0.3 | 0.3 |
| amount of lubricant wt % |  | 0.2 | 0.2 | 0.2 | 0.2 | 0.2 |
| stretch ratio | longitudinal direction (times) | 3.3 | 3.3 | 2.8 | 3.5 | 3.6 |
|  | transverse direction (times) | 3.4 | 3.4 | 3.0 | 3.6 | 3.8 |
| heat setting temperature (° C.) |  | Tg + 105 | Tg + 105 | Tg + 125 | Tg + 105 | Tg + 105 |
| thickness μm |  | 75 | 75 | 75 | 75 | 75 |
| thickness non-uniformity % |  | 4 | 4 | 6 | 4 | 5 |
| difference in absolute value between plane orientation coefficient of front side & that of rear side |ns on front side - ns on rear side| |  | 0.002 | 0.002 | 0.001 | 0.005 | 0.001 |
| increase in deformation | longitudinal direction % | 0.035 | 0.045 | 0.035 | 0.030 | 0.070 |
|  | transverse direction % | 0.035 | 0.045 | 0.035 | 0.030 | 0.070 |
| young's modulus | longitudinal direction kg/mm$^2$ | 600 | 600 | 550 | 630 | 540 |
|  | transverse direction kg/mm$^2$ | 620 | 620 | 570 | 640 | 550 |
| intrinsic viscosity dl/g |  | 0.54 | 0.54 | 0.54 | 0.54 | 0.51 |
| density g/cm$^3$ |  | 1.358 | 1.358 | 1.361 | 1.358 | 1.352 |
| thermal shrinkage factor (150° C. × 30 min) | longitudinal direction % | 0.05 | 0.05 | 0.03 | 0.15 | 0.15 |
|  | transverse direction % | 0.01 | 0.01 | 0.01 | 0.03 | 0.03 |
| surface roughness (Ra) nm |  | 10 | 10 | 10 | 10 | 10 |
| moisture-vapor transmission g/m$^2$ mm 24 hr |  | 0.16 | 0.16 | 0.14 | 0.16 | 0.20 |
| endothermic peak temperature ° C. |  | 125 | 120 | 125 | 125 | 125 |
| quantity of endothermic energy mJ/mg |  | 0.7 | 0.5 | 0.8 | 0.6 | 0.8 |

TABLE 5-continued

| | Ex. 35 | Ex. 36 | Ex. 37 | Ex. 38 | Ex. 39 |
|---|---|---|---|---|---|
| handling properties | ◯ | ◯ | ◯ | ◯ | ◯ |
| processability | ◎ | ◎ | ◎ | ◯ | ◎ |
| evaluation on functionality of membrane switch | ◯ | ◯ | ◯ | ◯ | △ |
| overall evaluation | ◎ | ◎ | ◎ | ◯ | ◯ |

Ex.: Example

What is claimed is:

1. A biaxially oriented polyester film for a membrane switch,
   (A) which comprises a polyester containing at least 80 mol % of ethylene-2,6-naphthalene dicarboxylate recurring units, and
   (B) which has an endothermic peak with an endothermic energy of at least 0.4 mJ/mg at a temperature of 110 to 160° C.

2. The biaxially oriented polyester film of claim 1, wherein the polyester (A) contains at least 85 mol % of ethylene-2,6-naphthalene dicarboxylate recurring units.

3. The biaxially oriented polyester film of claim 1, wherein the polyester (A) has an intrinsic viscosity of 0.40 to 0.90 dl/g.

4. The biaxially oriented polyester film of claim 1, wherein the endothermic peak (B) has an endothermic energy of at least 0.5 mJ/mg.

5. The biaxially oriented polyester film of claim 1, which has a density of 1.345 to 1.370 g/cm$^3$.

6. The biaxially oriented polyester film of claim 1, wherein two directions intersecting at right angles, in which the rate of increase in deformation after the film is placed under a load of 0.75 kg/mm$^2$ at 80° C. for 30 hours is 0.070% or less and in which the amount of residual deformation after the load is removed is 0.090% or less, are present within the plane of the film.

7. The biaxially oriented polyester film of claim 6, wherein the rate of increase in deformation is 0.065% or less.

8. The biaxially oriented polyester film of claim 6, wherein the amount of residual deformation is 0.085% or less.

9. The biaxially oriented polyester film of claim 1, wherein two directions intersecting at right angles, in which the 1% elongation stress is 4.5 to 7.0 kg/mm$^2$, are present within the plane of the film.

10. The biaxially oriented polyester film of claim 9, which has a 1% elongation stress of 4.7 to 6.8 kg/mm$^2$.

11. The biaxially oriented polyester film of claim 1, wherein two directions intersecting at right angles, in which the Young's modulus is 400 to 700 kg/mm , are present within the plane of the film.

12. The biaxially oriented polyester film of claim 1, which has a refractive index in a thickness direction of 1.490 to 1.530.

13. The biaxially oriented polyester film of claim 12, which has a refractive index in a thickness direction of 1.495 to 1.520.

14. The biaxially oriented polyester film of claim 1, which has a moisture-vapor transmission of 0.03 to 0.35 g/m$^2$·mm·24 hr or less.

15. The biaxially oriented polyester film of claim 1, wherein two directions intersecting at right angles, in which the thermal shrinkage factor after 30 minutes of a heat treatment at 150° C. is 0.20% or less, are present within the plane of the film.

16. The biaxially oriented polyester film of claim 1, which has a plane orientation coefficient of 0.242 to 0.270.

17. The biaxially oriented polyester film of claim 1, which has a center line average surface roughness of 5 to 200 nm.

18. The biaxially oriented polyester film of claim 1, which has a thickness of 12 to 250 µm.

19. The biaxially oriented polyester film of claim 1, which has a thickness non-uniformity of 10% or less.

20. A process for producing the biaxially oriented polyester film of claim 1, which comprises subjecting a biaxially oriented polyester film which has been produced from a polyester containing at least 80 mol % of ethylene-2,6-naphthalene dicarboxylate recurring units in accordance with a method known per se, to the following steps in the order named:
   (1) the step of heating the film under no strain at a temperature of 150 to 180° C. for 1 to 5 hours; and
   (2) the step of heating the film in an unrolled or rolled state at a temperature of 80 to 122° C. for 5 to 200 hours.

21. A membrane switch comprising the biaxially oriented polyester film of claim 1.

22. The membrane switch of claim 21, which is embedded in the seat of a car to distinguish between an adult and a child by detecting the weight of a seated person so as to adjust the inflation speed of an air bag which works at the time of a car crash.

* * * * *